United States Patent
Udo (12) 
(10) Patent No.: US 11,200,017 B2
(45) Date of Patent: Dec. 14, 2021

(54) METHOD FOR PROVIDING CLOUD PRINT SERVICE AND SERVER

(71) Applicant: CANON KABUSHIKI KAISHA, Tokyo (JP)

(72) Inventor: Hayato Udo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/935,877

(22) Filed: Jul. 22, 2020

(65) Prior Publication Data

US 2021/0042074 A1    Feb. 11, 2021

(30) Foreign Application Priority Data

Aug. 8, 2019   (JP) .............................. JP2019-146643

(51) Int. Cl.
*G06F 3/12* (2006.01)
*H04N 1/00* (2006.01)

(52) U.S. Cl.
CPC .......... *G06F 3/1296* (2013.01); *G06F 3/1293* (2013.01); *H04N 1/00244* (2013.01)

(58) Field of Classification Search
None
See application file for complete search history.

(56) References Cited

U.S. PATENT DOCUMENTS

| 2004/0001217 | A1* | 1/2004 | Wu | G06F 3/1204 |
| | | | | 358/1.15 |
| 2014/0253962 | A1* | 9/2014 | Neville | G06F 3/1209 |
| | | | | 358/1.15 |

FOREIGN PATENT DOCUMENTS

| JP | 2012-094113 A | 5/2012 |
| JP | 2012-133489 A | 7/2012 |

* cited by examiner

*Primary Examiner* — Fan Zhang
(74) *Attorney, Agent, or Firm* — Canon U.S.A., Inc. IP Division (57) ABSTRACT

A method for providing a cloud print service includes receiving, from an external apparatus, a print job that is to be transmitted to a printing apparatus, and registering in the cloud print service at least one or more printer objects that is used to transfer the received print job to the printing apparatus, transmitting, to the second cloud print service, a registration request to register at least one of the printer objects registered in the cloud print service as a cloud printer that is used by a second cloud print service different from the provided cloud print service, and transmitting, in a case where a cloud printer corresponding to the printer object is registered as the cloud printer of the second cloud print service based on the registration request, ability information indicating that a printing apparatus corresponding to the printer object supports a pass-through mode.

11 Claims, 10 Drawing Sheets

| COOPERATION PARTNER | CPS THAT LISTS ATTRIBUTES RELATED TO PASS-THROUGH | CPS THAT SUPPORTS PASS-THROUGH | CPS THAT DOES NOT SUPPORT PASS-THROUGH |
|---|---|---|---|
| CPS105 | ✓ | ✓ | — |
| CPS106 | ✗ | ✓ | — |
| CPS107 | ✗ | ✗ | ✓ |

FIG.6A

ABILITY INFORMATION REGARDING
LOGICAL PRINTER MANAGED BY CPS 104

ABILITY INFORMATION printer-name:MFP108
copies-support = yes
printer-state = idle
Documentation-format =
pdf, jpeg, tiff, pwg-raster, PCL

FIG.6B

ABILITY INFORMATION TRANSMITTED IN S505A

ABILITY INFORMATION printer-name: MFP108 (via CPS104)
copies-support = yes
printer-state = idle
Documentation-format = {pass-through,
pdf, jpeg, tiff, pwg-raster, PCL}
Job-Pass-through-Support = Yes
Pass-through-permit-
format={XPS,EMF,xlsx,pptx...}

FIG.6C

ABILITY INFORMATION TRANSMITTED IN S505B

ABILITY INFORMATION printer-name: MFP108 (via CPS104)
copies-support = yes
printer-state = idle
Documentation-format =XPS, EMF,
docx, xlsx, pptx ...

ABILITY INFORMATION REGARDING
LOGICAL PRINTER MANAGED BY CPS 104

ABILITY INFORMATION printer-name:MFP109
copies-support = No
printer-state = idle
Documentation-format = pwg-raster, JPEG

US 11,200,017 B2

METHOD FOR PROVIDING CLOUD PRINT SERVICE AND SERVER

BACKGROUND

Field of the Disclosure

The present disclosure relates to a method for providing a cloud print service.

Description of the Related Art

In recent years, a cloud print service in which a print job is submitted via a cloud and the submitted print job is transmitted to a printing apparatus becomes widely available. The publication of Japanese Patent Application Laid-Open No. 2012-133489 discusses a printing technique that is performed via a cloud print service. In such a printing system, first, a manager registers a printing apparatus in a cloud print service to which the manager belongs. Subsequently, the manager sets which user is permitted to use the printing apparatus.

The user permitted to use the printing apparatus submits a print job to the cloud print service from a client terminal. The cloud print service saves the received print job in storage. The printing apparatus acquires the print job saved in the cloud print service and performs printing.

Examples of the cloud print service include Google Cloud Print (registered trademark), Microsoft Hybrid Cloud Print (registered trademark), and uniFLOW Online (registered trademark).

The publication of Japanese Patent Application Laid-Open No. 2012-94113 discusses a technique for receiving data for printing from a client and then rendering the data on the server, where the data is converted into print data in a format supported by a printing apparatus.

SUMMARY

According to embodiments of the present disclosure, a method for providing a cloud print service includes receiving, from an external apparatus, a print job that is to be transmitted to a printing apparatus, and registering in the cloud print service at least one or more printer objects that is used to transfer the received print job to the printing apparatus, transmitting, to the second cloud print service, a registration request to register at least one of the printer objects registered in the cloud print service as a cloud printer that is used by a second cloud print service different from the provided cloud print service, and transmitting, in a case where a cloud printer corresponding to the printer object is registered as the cloud printer of the second cloud print service based on the registration request, ability information indicating that a printing apparatus corresponding to the printer object supports a pass-through mode.

Further features of the present disclosure will become apparent from the following description of exemplary embodiments with reference to the attached drawings.

DESCRIPTION OF THE EMBODIMENTS

With reference to the drawings, exemplary embodiments are described below.

In an enterprise environment, client terminals of a plurality of operating system (OS) vendors e.g., Windows (registered trademark) OS, mac OS (registered trademark), and Chrome (registered trademark) OS are used. In recent years, cloud platforms become widely used. Consequently, there are increasing cases where a single business entity uses a plurality of different cloud platforms (e.g., Amazon Web Services (AWS), Azure, and Google Cloud Platform) together. There are also increasing cases where cloud platforms provide cloud print services to a user who uses the cloud platforms, so that the user can easily perform printing. In these cases, a plurality of cloud print services (e.g., cloud print services A to C) is mixed together.

As a form of printing via the plurality of cloud print services, cooperation among the plurality of cloud print services is possible. For example, a print job transmitted to a cloud printer managed by a second cloud print service is transferred to a first cloud print service with which the second cloud print service cooperates, and is transmitted to a printing apparatus via the first cloud print service.

To reduce the load on the client terminal, data of a print job received from a client terminal may be rendered into Portable Document Format (PDF) or raster data on a cloud server.

In a system configuration in which a plurality of cloud print services cooperates with each other to transmit a print job to a printing apparatus, in a case where data is converted on a service on the upstream side, this may interfere with data conversion on a cloud print service on the downstream side. For example, print data is converted into PDF on a cloud print service on the upstream side and transferred to a cloud print service on the downstream side. Subsequently, the cloud print service on the downstream side converts the received print data into Printer Command Language (PCL) as a page description language (PDL) supported by a printer. In this case, since two conversion processes are performed, image quality or print quality may decrease. Further, in a case where two conversion processes are performed, calculation resources on the cloud may also be wasted.

In view of at least one of the above issues, a first exemplary embodiment provides a mechanism for performing control so that when a logical printer of a first cloud print service is registered as an output printer of a second cloud print service, data is not converted on the second cloud print service. This is specifically described below. The following exemplary embodiments do not limit the disclosure according to the appended claims, and not all the combinations of the features described in the exemplary embodiments are deemed to be essential.

Figure 1:
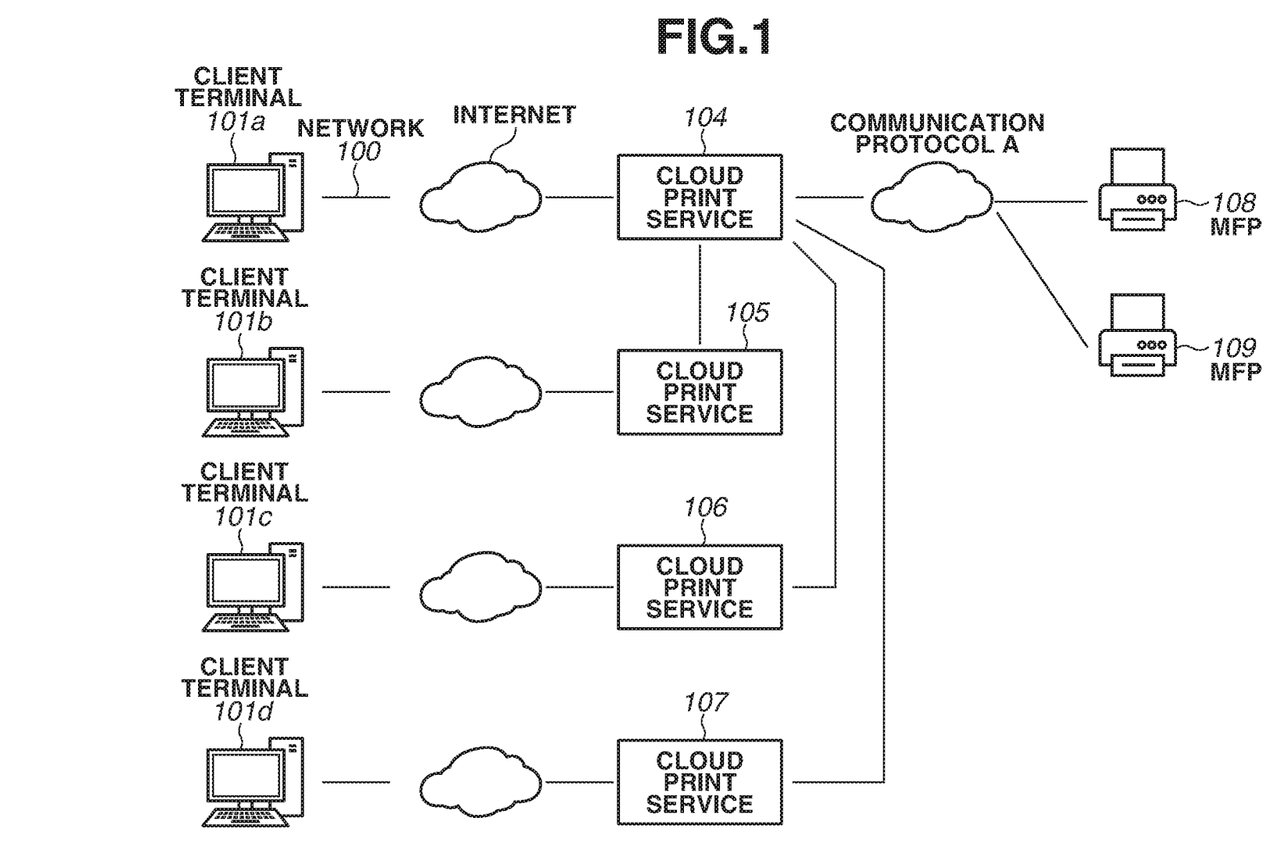
FIG. 1 is a diagram illustrating an example of a printing system.

First, with reference to FIG. 1, the configuration of a printing system according to the present disclosure is described. A printing system according to the first exemplary embodiment includes multifunction peripherals (MFPs) 108 and 109, client terminals 101a to 101d, and cloud print services (hereinafter also referred to as "CPSs") 104 to 107.

Each of the MFPs 108 and 109 has a scan function for transmitting data based on an image obtained by reading a document using a scanner to outside, a print function for printing an image on a sheet such as paper based on a print job received from an external apparatus, and a copy function. Each of the MFPs 108 and 109 can also receive a print job via any of the cloud print services 104 to 107 and perform printing.

As an example, the MFP 108 has the ability to print documents in formats such as PDF, Joint Photographic Experts Group (MEG), Tagged image File Format (TIFF), Printer Working Group (PWG) Raster, and PCL. On the other hand, the MFP 109 has the ability to print documents subjected to raster conversion and in formats such as JPEG and PWG-Raster, but does not have the ability to print documents in formats including intermediate data and typified by PDF and PCL.

In the present exemplary embodiment, an MFP having a plurality of functions is illustrated as an example of a printing apparatus. The present disclosure, however, is not limited to this. For example, the printing apparatus may be a single-function peripheral (SFP) having only a print function. In the present exemplary embodiment, printing on a sheet such as paper is illustrated as an example. The present disclosure, however, is not limited to this, and can also be applied to print control in 3D printing for forming a three-dimensional object based on three-dimensional shape data.

In the printing system according to the present exemplary embodiment, the CPSs 105 to 107 are configured to cooperate with the CPS 104 to perform printing. For example, a print job transmitted to a cloud printer managed by the CPS 105 is transferred from the CPS 105 to the CPS 104, Subsequently, the CPS 104 transmits the print job transferred from the CPS 105 to the MFP 108 or 109. In the above-described way, cloud print services can cooperate to perform printing.

In the system configuration illustrated in FIG. 1, in a case where data in a print job is converted in any of the CPSs 105 to 107 on the upstream side, this may interfere with data conversion in the CPS 104 on the downstream side. The example case is as follows: the CPS on the upstream side converts print data into a format such as PDF according to the ability of a logical printer provided by the CPS 104 on the downstream side and transfers the converted print data to the CPS 104 on the downstream side. Subsequently, the CPS 104 on the downstream side converts the received print data into PCL as a PDL supported by a printer. In this case, since two conversion processes are performed, image quality or print quality may decrease. Further, in a case where two conversion processes are performed, calculation resources on the cloud may also be wasted.

The present exemplary embodiment provides a mechanism for, when a logical printer managed by the CPS 104 is registered as an output destination printer of the CPSs 105 to 107, preventing data from being converted in the CPSs 105 to 107. This is specifically described below.

The description returns to FIG. 1. The CPS 104 is a cloud print service configured to receive a print job from the client terminal 101a and acquire print jobs saved in the external CPSs 105 to 107.

The CPSs 105 to 107 are external CPSs that receive print job from the client terminals 101b, 101c, and 101d and save the print jobs. In the present exemplary embodiment, the CPSs 104 to 107 are cloud print services of different types provided by service providers different from each other. The mechanisms of print protocols or job notifications of these cloud print services may be achieved by different methods, or may be achieved by a similar method. Optional functions or partial specifications supported by these methods may be different from each other.

FIG. 1 illustrates a case where the MFPs 108 and 109 are registered as cloud printers (also referred to as "logical printers") that can be used via the CPS 104. In the present exemplary embodiment, a cloud printer or a logical printer refers to a virtual printer that is configured by software and looks like an actual printer when viewed from a print client. In the cloud printer or the logical printer, software having the function of managing a job and the function of transmitting the job to a real printer is simply referred to also as a "printer object". The MIT 108 or 109 registered in the CPS 104 acquires a print job saved in the CPS 104 and executes a printing process.

These apparatuses are connected together via a network 100 so that the apparatuses can communicate with each other. The network 100 may be configured by combining a communication network such as a local area network (LAN) or a wide area network (WAN), a public wireless communication network (e.g., Long-Term Evolution (LTE) or 5G), and a wireless network compliant with the Institute of Electrical and Electronics Engineers (IEEE) 802.11. That is, so long as the network 100 can transmit and receive data, any method may be employed as a method for communication between physical layers.

<Hardware Configuration>

Figure 2:
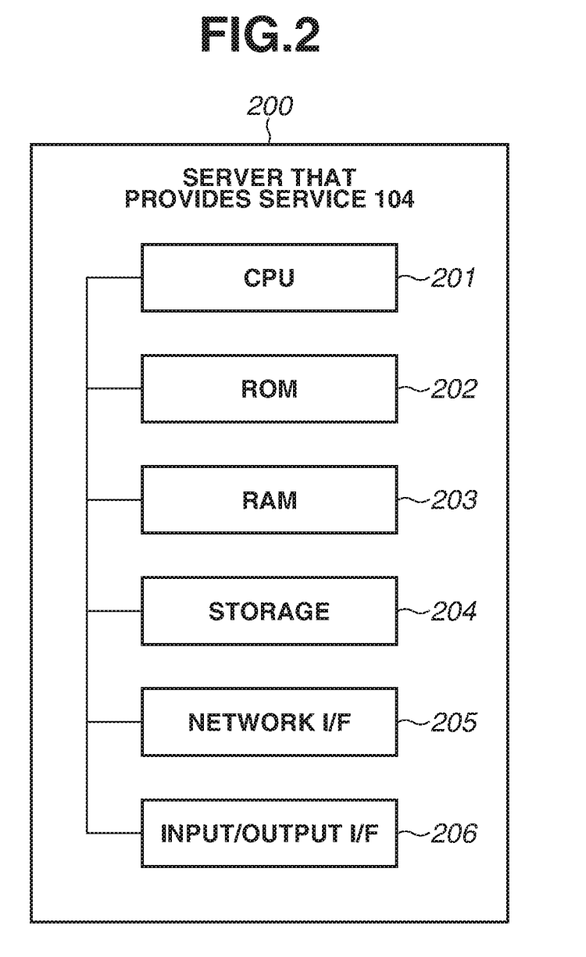
FIG. 2 is a diagram illustrating an example of a hardware configuration of a server that provides a cloud print service (CPS).

FIG. 2. is a block diagram illustrating the hardware configuration of a server 200 as a real resource that provides the CPS 104. A central processing unit (CPU) 201 cooperates with components to control the operation of the server 200. The CPU 201 reads an OS and a control program stored in a read-only memory (ROM) 202 or storage 204 and executes the OS and the control program. The ROM 202 stores a control program that can be executed by the CPU 201. A random-access memory (RAM) 203 is a main storage memory of the CPU 201 and is used as a work area or a temporary storage area into which various types of control programs are loaded. The storage 204 stores print data, image data, various programs, and various pieces of setting information. In the present exemplary embodiment, an auxiliary storage device such as a hard disk drive (HDD) is used as the storage 204. Alternatively, a non-volatile memory such as a solid-state drive (SSD) may be used instead of the HDD. Pieces of hardware such as the CPU 201, the ROM 202, and the RAM 203 thus compose a so-called computer. The server 200 may further include an application-specific integrated circuit (ASIC) that renders print data. In the present exemplary embodiment, for illustrative purposes, a case is illustrated where a single CPU 201 executes processes illustrated in flowcharts described below, using a single memory (the RAM 203). Alternatively, another form may be used. For example, a plurality of processors, RAMs, ROMs, and spaces of storage can also cooperate to execute the processes illustrated in the flowcharts described below. Yet alternatively, the processes described below can also be executed using a plurality of server computers. The server 200 can provide the CPS 104 of a first type to a plurality of different tenants using a containerization technique or a virtualization technique.

A network interface (I/F) 205 is an interface for performing network communication with outside. The server 200 is connected to the network 100 via the network I/F 205. An input/output I/F 206 is an interface to which input/output devices such as a keyboard, a mouse, and a display are connected. The input/output devices connected to the input/output I/F 206 are used to maintain the real server that provides the cloud service.

<Software Configuration>

Figure 3:
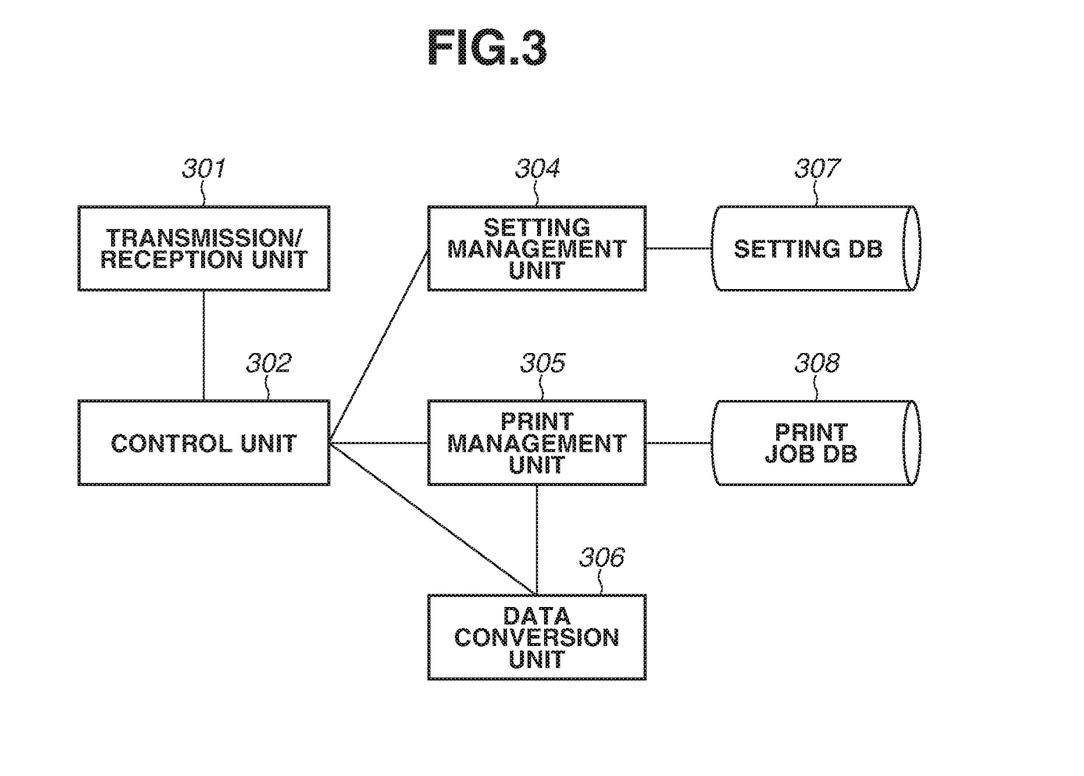
FIG. 3 is a diagram illustrating an example of a software configuration of the CPS.

FIG. 3 is a diagram illustrating the configuration of software modules that operate on the CPS 104. The software modules are stored in the storage 204 illustrated in FIG. 2 and are loaded into the RAM 203 and executed by the CPU 201.

A transmission/reception unit 301 communicates with the client terminal 101a or the MFP 108 via the network I/F 205. A control unit 302 executes processing according to a transmission request to transmit a print job or an acquisition request to acquire a print job that is received by the transmission/reception unit 301. A setting management unit 304 saves, in a setting database (DB) 307, various pieces of setting information regarding the CPS 104, information regarding an external CPS with which the CPS 104 cooperates, and information regarding an MFP registered in the CPS 104 and performs control. The setting DB 307 also stores association information in which user-agent information regarding an external CPS is associated with information indicating whether the external CPS is a cloud print service that supports a pass-through operation.

A print management unit 305 performs control to save, in a print job DB 308, a print job received from the client terminal 101a or a print job acquired from an external CPS, and performs image processing such as rendering on the print job. A data conversion unit 306 performs a conversion process for converting print data included in the received print job into a PDL supported by the MFP 108 or 109. The converted PDL data is transmitted to the print management unit 305. The print management unit 305 generates a new print job based on the converted PDL data and saves the new print job in the print job DB 308. The data conversion unit 306 can also perform the conversion process by cooperating with a hardware circuit such as an ASIC or a digital signal processor (DSP).

<Process of Registering Printer in CPS 104>

Figure 4:
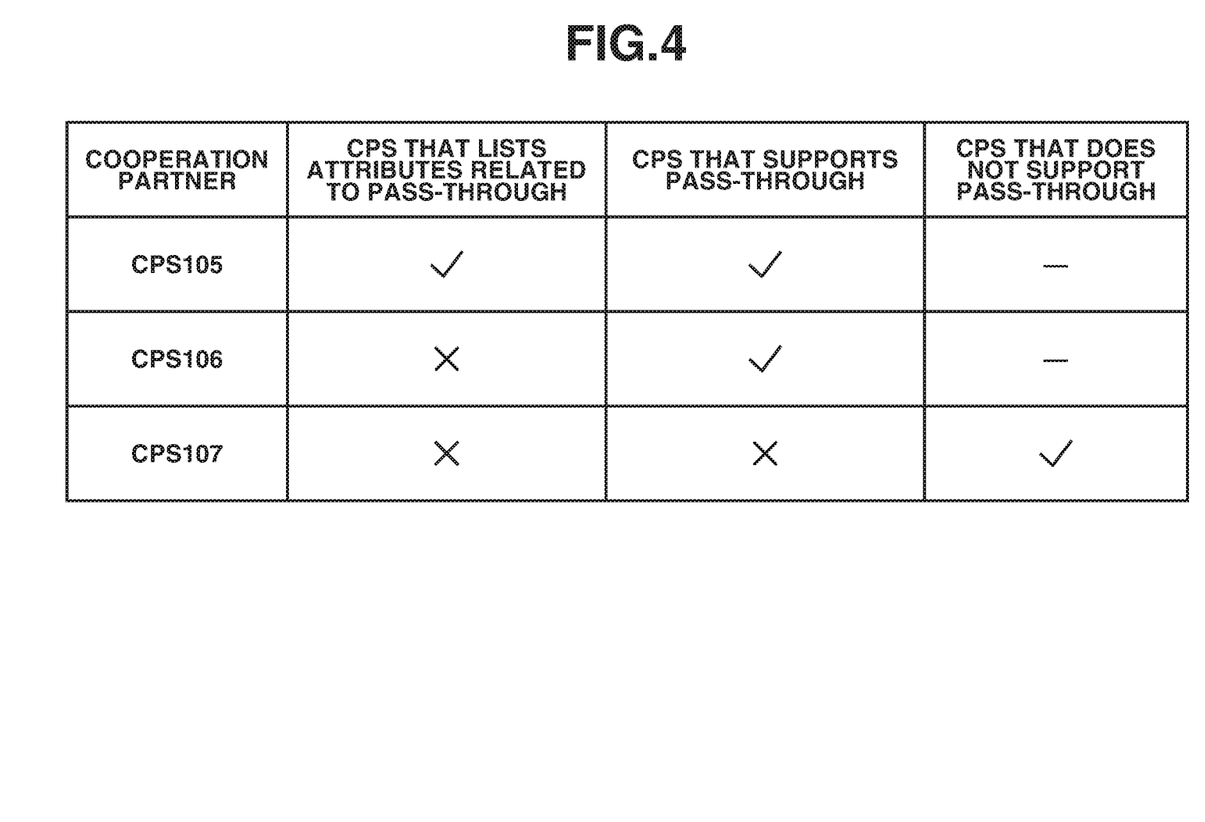
FIG. 4 is a diagram illustrating examples of client abilities supported by external CPSs.

Next, with reference to FIG. 4, abilities and specifications supported by the external CPSs 105 to 107 are described. In the present exemplary embodiment, as described above, to perform control so that data is not converted in a cloud print service on the upstream side, ability information of which the cloud print service is to be notified is utilized.

For example, in the printing mechanism of the Internet Printing Protocol (IPP), a print client performs a request to inquire about ability information regarding a printer and acquires the ability information regarding the printer. For example, the ability information is exchanged using a "Get-Printer-Attributes" operation. In this process, the client can list attribute names of interest or attribute group names of interest as a "requested-attributes" attribute in the acquisition request to acquire the ability information. The CPS 105 includes, in the acquisition request to acquire the ability information, predetermined attribute names for inquiring whether the printer permits a pass-through operation for transmitting a print job received from the print client without converting the print job. The predetermined attribute names are to be indicated by "Job-Pass-through-Supported", for example. This attribute name is merely an example, and another attribute name may be used.

In the following description, as illustrated in FIG. 4, the CPS 105 can lists the predetermined attribute names in the acquisition request to acquire the ability information, and can perform the pass-through operation. The CPS 106 does not list the predetermined attribute names in the acquisition request to acquire the ability information, but can perform the pass-through operation. The CPS 107 does not support the pass-through operation, and supports only a print job in a format supported by both an output destination printer and the CPS 107.

As illustrated in FIG. 4, the CPSs 105 and 106 support the pass-through operation. Thus, the CPS 104 returns ability information indicating that the pass-through operation is permitted. Meanwhile, the CPS 107 does not support the pass-through operation. The CPS 104 returns ability information indicating that only a document less likely to be subjected to data conversion in a print client or a cloud print service on the upstream side is supported.

Figure 5:
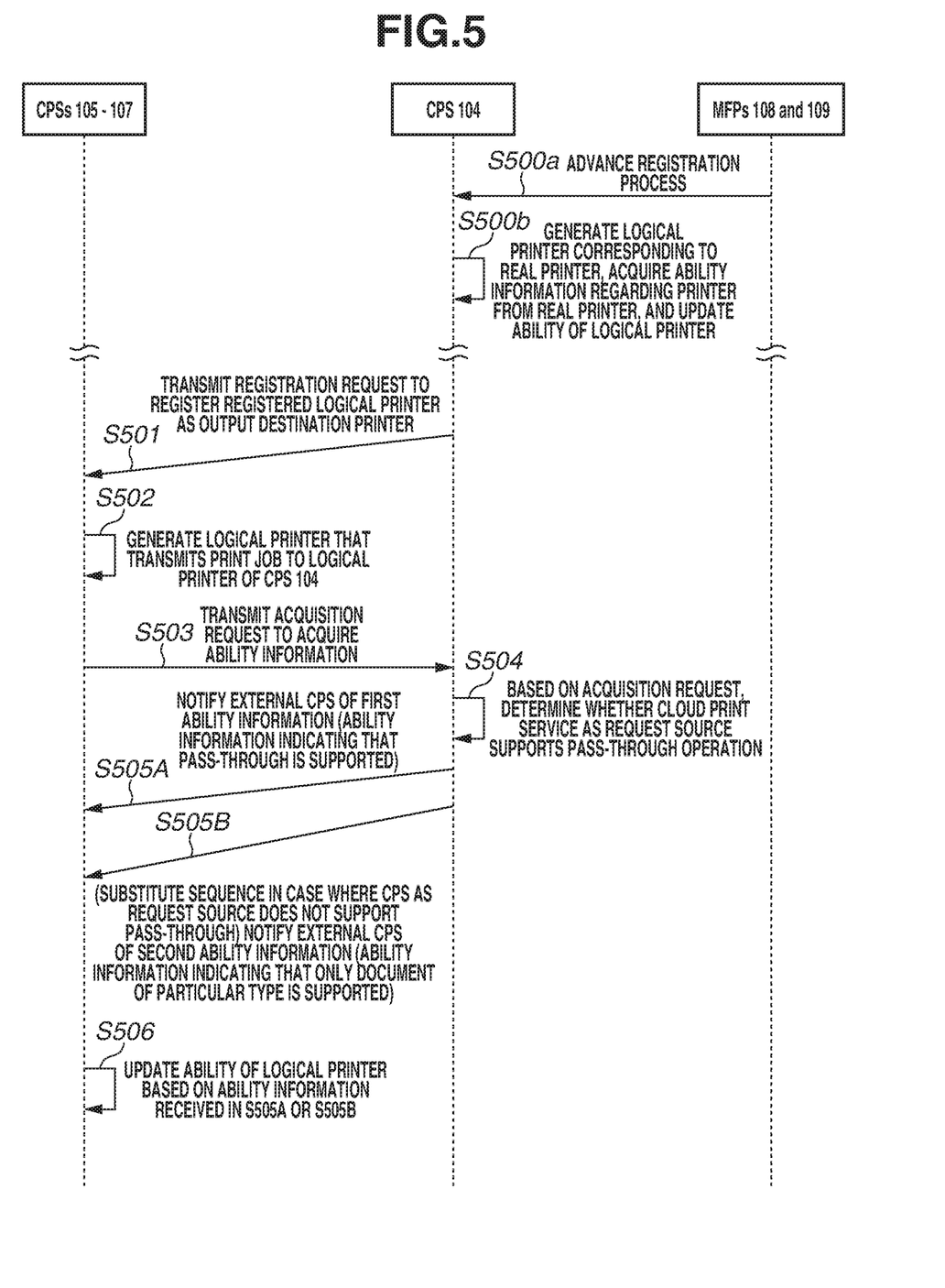
FIG. 5 is a sequence diagram illustrating examples of registration of a printer in. any of the external CPSs and updates of abilities.
Figure 6A:
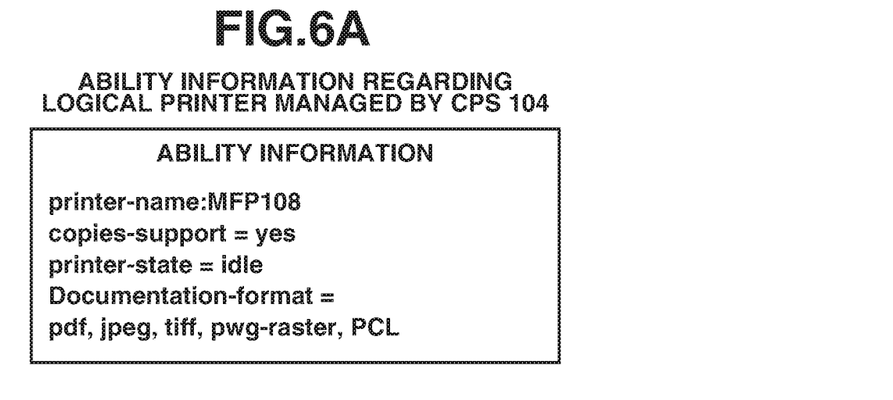
FIGS. 6A, 6B, and 6C are diagrams illustrating examples of ability information. regarding a logical printer.
Figure 6B:
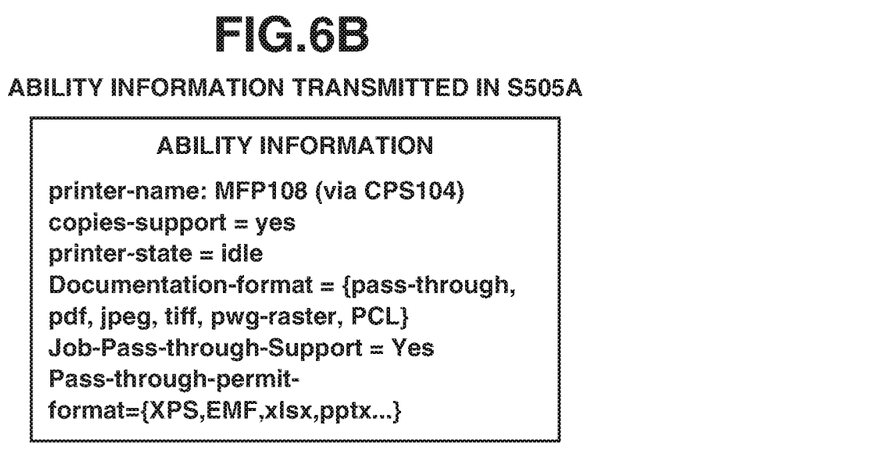
Figure 6C:
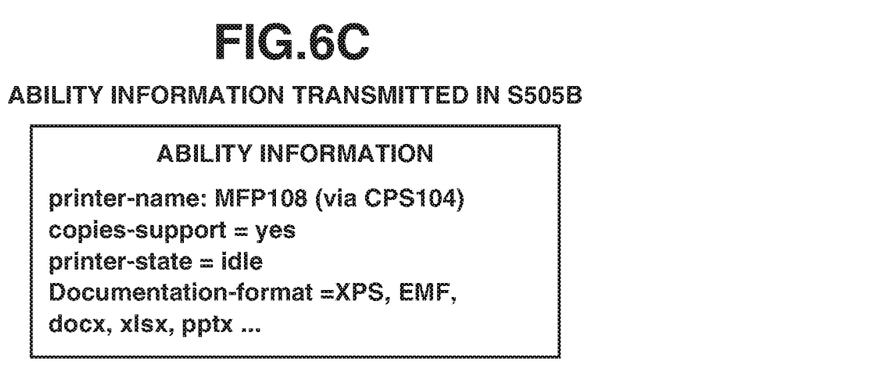

With reference to FIGS. 5, 6A, 6B, and 6C, a sequence related to the registration of a printer is described. FIG. 5 is an example of a control sequence related to the registration of a printer. FIGS. 6A, 6B, and 6C are examples of ability information.

In step S500a in the sequence, the CPS 104 receives a registration process for registering an MFP (e.g., the MFP 108) in a cloud print service provided by the CPS 104.

In step S500b, the CPS 104 having received the registration process from the MFP generates a logical printer corresponding to an MFP (e.g., the MFP 108) having transmitted a registration request, acquires ability information regarding the printer from the MFP having transmitted the registration request, and updates the ability of the logical printer.

FIG. 6A illustrates an example of the ability information regarding the logical printer corresponding to the MFP 108 and managed by the CPS 104. The first and second lines indicate that the printer name is "MFP 108", and the printer supports number-of-copies specifying. The next line indicates that the printer is in an idle state. The last line indicates the types of documents for which the printer supports printing, and indicates that the printer supports PDF, JPEG, TIFF, PWG-Raster, and PCL.

By the processes of steps S500a and S500b, logical printers corresponding to the MFPs 108 and 109 are registered in the CPS 104.

The description returns to FIG. 5. In step S501, based on an operation by a user such as a manager who manages tenants of the CPS 104, the CPS 104 receives a registration request to register the logical printer registered in the CPS 104 in an external CPS. The CPS 104 having received the registration request transmits to the external CPS the registration request to register the registered logical printer as an output destination printer.

In the present exemplary embodiment, an external CPS as a registration destination or a logical printer that should be registered is selected by the user through a setting screen (not illustrated), and based on the selection, the CPS 104 requests the selected external CPS to register the selected logical printer. The present disclosure, however, is not limited to this. Alternatively, a plurality of logical printers managed by the CPS 104 may be registered as output destination printers of the external CPS selected by the user. For illustrative purposes, a description is given using as an example a case where a request to register the logical printer corresponding to the MFP 108 as an output destination printer of the CPS 105 is performed.

In step S502, the external CPS (the CPS 105) having received the registration request generates a logical printer that transmits a print job to the logical printer of the CPS 104. Subsequently, in step S503, the external CPS (the CPS 105) transmits to the CPS 104 an acquisition request to acquire the ability information. In step S504, the CPS 104 having received the acquisition request to acquire the ability information determines, based on the acquisition request, whether the cloud print service as the request source supports the pass-through operation. The specific determination will be described with reference to flowcharts described below.

In a case where it is determined in step S504 that the cloud print service as the request source supports the pass-through operation, then in step S5054, the CPS 104 notifies the external CPS of first ability information including information indicating that the pass-through mode is supported.

In response to step S503, in step S506, the external CPS having received the ability information transmitted from the CPS 104 updates the ability of the logical printer newly generated on the external CPS, based on the received ability information.

FIG. 6B illustrates an example of the ability information of which the external CPS 105 that supports the pass-through mode is notified in step S505A. The first to third lines are similar to those in FIG. 6A. As the printer name, however, a name is used that allows the user to know that a print job is output via the CPS 104, such as "MFP 108 (via CPS 104)". The ability information in FIG. 6B is different from the ability information regarding the logical printer described with reference to FIG. 6A in the types of documents for which the printer supports printing. In FIG. 6B, "pass-through" is added to the types of documents for which the printer supports printing. As described with reference to FIG. 4, the CPS 105 transmits an acquisition request that lists attribute names related to pass-through as attributes of interest. Thus, the CPS 104 includes, in a response to the request from the external CPS 105, an attribute value indicating that pass-through is permitted (the pass-through mode is supported). The last line indicates a set of additional attribute names and attribute values regarding the pass-through mode. In this case, as the attribute values, formats that permit the pass-through operation are listed. In a case where receiving a document that matches the attribute values, the external CPS performs control to transfer the document to the CPS 104 without converting the document into PDF or raster data.

Referring back to FIG. 5, a description is given of a substitute sequence in a case where it is determined that the pass-through operation is not supported. In this case, the description is given using as an example case where, in step S501, a request to register the logical printer corresponding to the MFP 108 as an output destination printer of the CPS 107 that does not support the pass-through operation is performed.

In a case where it is determined in step S504 that the cloud print service as the request source supports the pass-through operation, then in step S505B, the CPS 104 notifies the external CPS (e.g., the CPS 107) of second ability information indicating that only a document of a particular type is supported.

FIG. 6C illustrates an example of the ability information of which the external CPS 107 that does not support the pass-through operation is notified in step S505B. The first to third lines are similar to those in FIG. 6B. The ability information in FIG. 6C is different from the ability information regarding the logical printer described with reference to FIG. 6B in the types of documents for which the printer supports printing. The CPS 104 lists drawing formats used by applications to output drawings, such as Extensible Markup Language (XML) Paper Specification (XPS) and Enhanced Metafile (EMF), regardless of the actual printing ability of the MFP 108. Further, the CPS 104 lists the types of documents likely to be used by applications to output files, such as docx, xlsx, pptx, gsheet, and gdoc. Further, the CPS 104 purposely excludes the types of documents for which a print client or an external CPS is likely to include data conversion engines, such as PDF, PWG-Raster, and JPEG, from the type of documents for which the printer supports printing. Even in the case of an external CPS that does not support the pass-through operation, the external CPS is notified of such ability information, whereby it is possible to increase the possibility of causing the external CPS to operate to receive and transmit a print job without converting the print job.

Figure 7:
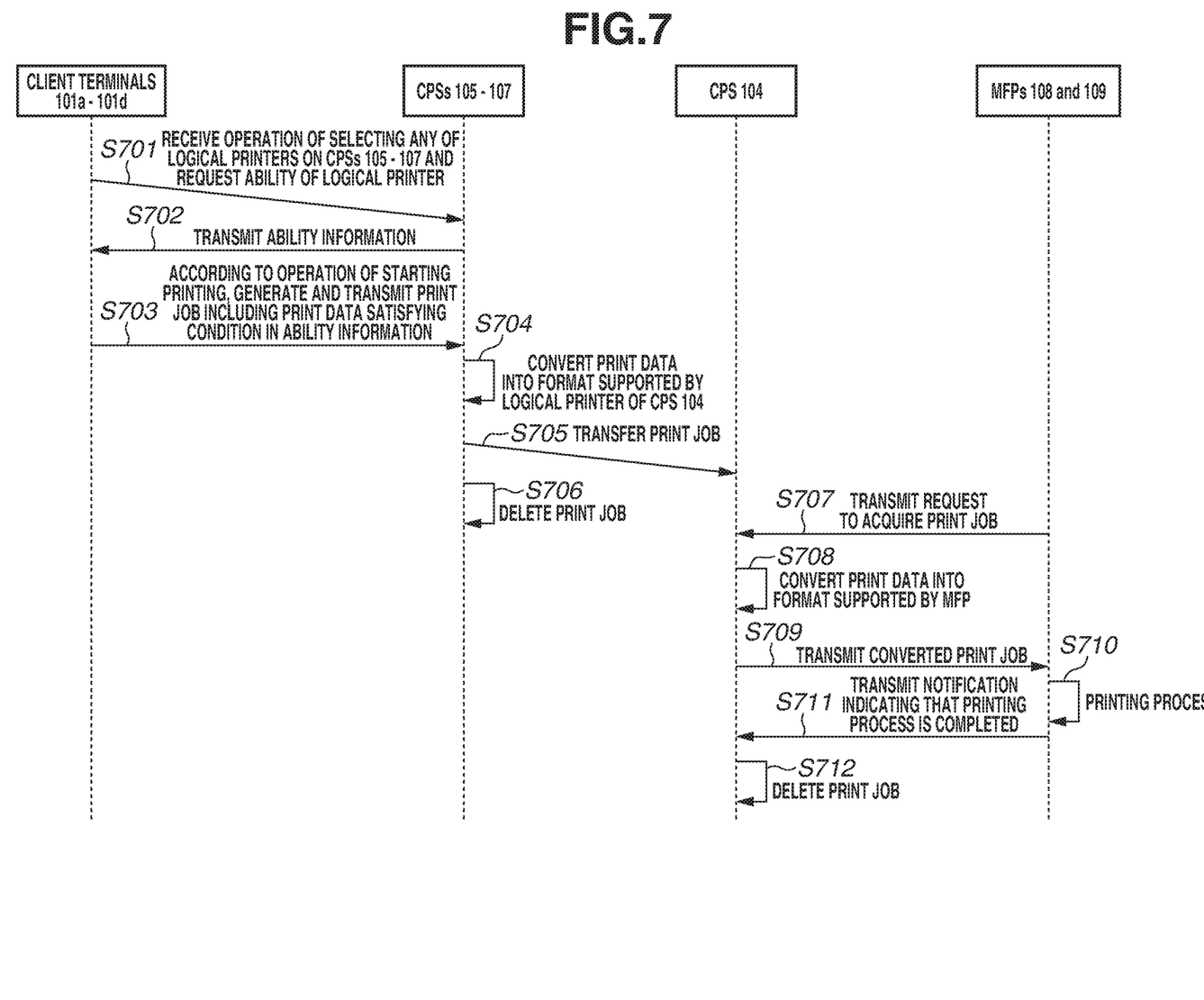
FIG. 7 is a sequence diagram illustrating an example of a printing process via a plurality of CPSs.

Next, with reference to FIG. 7, an example of a printing process via a plurality of CPSs is described. In step S701, any of print clients of the client terminals 101a to 101d receives the operation of selecting any of logical printers on the CPSs 105 to 107 that performs printing via the CPS 104, and requests the ability of the logical printer from the external CPS. In this case, the description is given using as an example case where an output destination printer registered in any of the CPSs 105 to 108 is selected to transmit a print job to a logical printer managed by the CPS 104.

In step S702, the CPS 105 transmits ability information to the print client as the inquiry source. Based on the ability information, the print client of the client terminal displays a print setting screen (not illustrated). In step S703, when print settings are performed, and a user operation for starting printing is performed, the client terminal generates a print job including print data in a format determined based on the ability information and transmits the print job to the external CPS.

The process of step S703 is described using a specific example. For example, in a case where the logical printer of a CPS that supports the pass-through operation is selected, the print client determines whether data for use in printing transmitted from an application to the print client is data of a type that permits the pass-through operation. In a case where it is determined that the data is data of a type that permits the pass-through operation, the print client generates a print job including the data for use in printing and print settings. In a case where, meanwhile, it is determined that the data is data of a type that does not permit the pass-through operation, then according to a predetermined priority order, the print client converts the print data into a document supported by the output destination printer of the external CPS. For example, first priority is given to which is a de facto standard in a printing apparatus, and second priority is given to a PDL. In a case where the output destination printer supports neither PCL nor a PDL, a raster format such as PWG-Raster or PEG is selected. The print client may convert the data for use in printing into a document of a type that permits the pass-through operation (e.g., XPS or EMF). The client terminal generates a print job including the converted print data and print settings and transmits the print job to the external CPS.

In a case where, meanwhile, the logical printer of a CPS that does not support the pass-through operation is selected, the client terminal converts data for use in printing into a document supported by the output destination printer of the external CPS, where necessary. Subsequently, the client terminal transmits a print job including the converted print data, where necessary. In this case, for example, as illustrated in FIG. 6C, only documents in formats less likely to decrease image quality or print quality are listed. Thus, a format less likely to decrease image quality or print quality is selected.

The description returns to FIG. 7. In step S704, the external CPS having received the print job from the client terminal converts the print data included in the print job into a format supported by the logical printer of the CPS 104. In a case where the print data is converted into an appropriate format in the process of step S703 or a case where the print data permits the pass-through operation, the conversion process in step S704 is not performed. The conversion process in step S704 is executed in a case where data received from a terminal that does not have a data conversion mechanism, such as an IoT device, is to be printed via an external CPS, or a case where data is directly submitted to an external CPS using a function such as a hot folder.

Subsequently, in step S705, the external CPS transfers the print job received from the client terminal to the CPS 104. In step S706, in a case where the transfer is completed, the external CPS deletes the print job.

The CPS 104 having received the print job from the external CPS stores the job in the print job DB 308.

In step S707, an MFP (e.g., the MFP 108) transmits to the CPS 104 a request to acquire a print job. In step S708, the CPS 104 having received the request converts print data included in a print job that is to be transmitted to the MIT, into a document of a type supported by the MFP. For example, the CPS 104 converts print data in the XPS, EMF, or xlsx format transferred to the CPS 104 without being converted due to the pass-through operation, into a document in the PCL format or the PDF format. The CPS 104 is, for example, a CPS provided by a printer vendor who designs and sells the MFP 108 or 109. Thus, an appropriate conversion process can be performed according to the characteristics and the ability of the MFP.

When the conversion is completed, then in step S709, the CPS 104 transmits the converted print job to the MFP having transmitted the request to acquire the print job. In step S710, the MFP having received the print job executes a printing process and outputs a print product. When the execution of the print job is completed, then in step S711, the MFP 108 transmits to the CPS 104 a notification indicating that the acquisition of the print job is completed. In step S712, the CPS 104 having received the notification deletes the print job. By the above series of processes, in the form of priming that is performed via both an external CPS and the CPS 104, a decrease in image quality or print quality due to data conversion that is performed many times can be prevented. A waste of calculation resources due to data conversion that is performed multiple times on a cloud can also be prevented.

Figure 8:
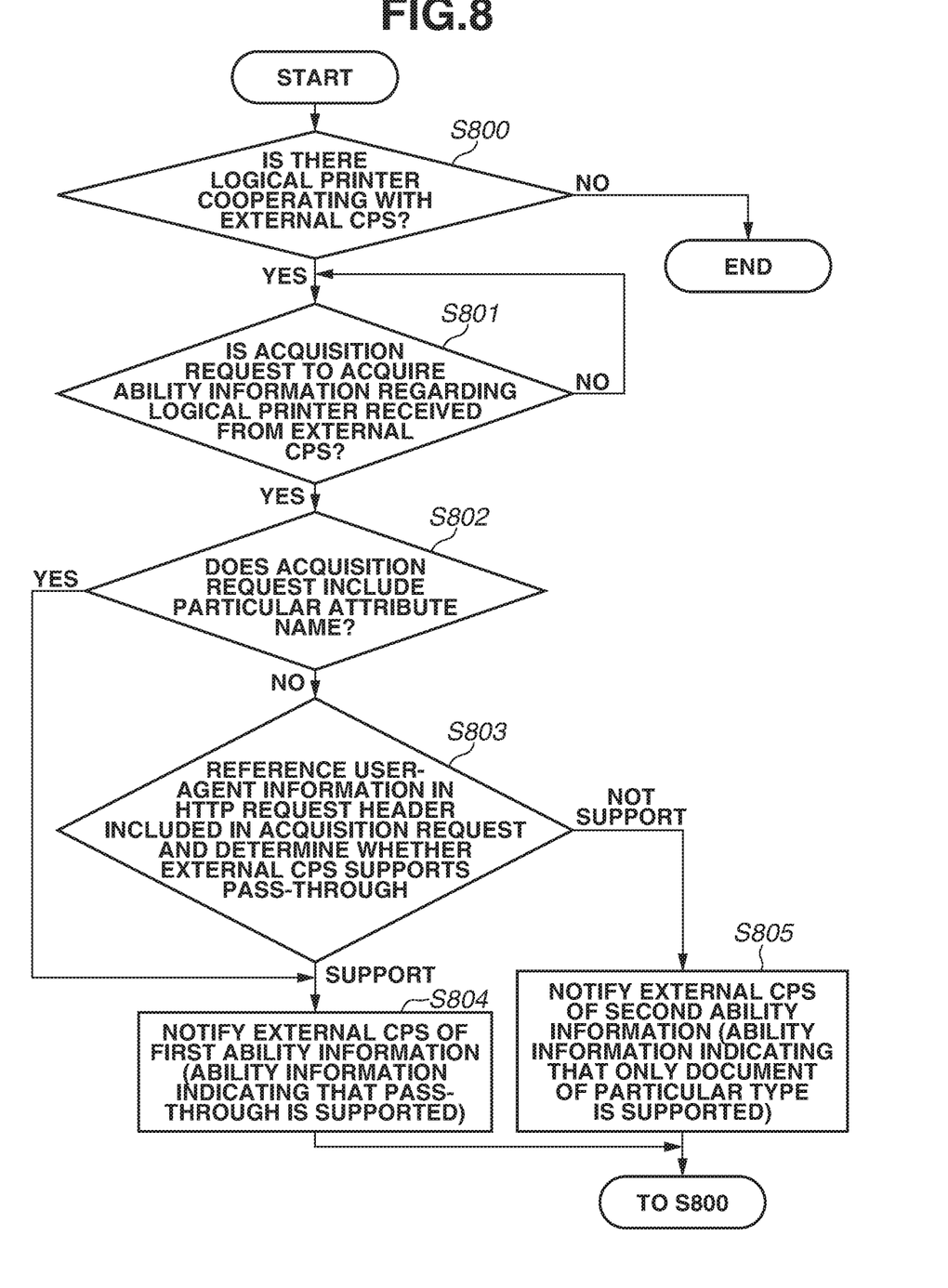
FIG. 8 is a flowchart illustrating an example of control executed by the server that provides the CPS.

Finally, with reference to a flowchart in FIG. 8, control executed by the CPS 104 is described. Operations (steps) illustrated in the flowchart in FIG. 8 are achieved by the CPU 201 loading programs corresponding to control modules for providing the CPS 104 and stored in the ROM 202 or the storage 204 into the RAM 203, and executing the programs. To achieve appropriate control of a plurality of tenants, a technique such as virtualization, containerization, or parallel distributed processing using a plurality of computers is appropriately used. In FIG. 8, for ease of description, the control of the notification of the ability information illustrated in steps S503 to S505A and S505B in FIG. 5 is mainly described. Other processes such as the registration process for registering a real printer, the registration request to register a logical printer, and the reception/printing process for receiving and printing print data are not described.

In step S800, the control unit 302 cooperates with the setting management unit 304 to determine whether there is a logical printer cooperating with an external CPS. In a case where there is a logical printer cooperating with an external CPS (YES in step S800), the processing proceeds to step S801. In a case where there is not a logical printer cooperating with an external CPS (NO in step S800), the processing ends without performing the series of processes in the notification control.

In step S801, the control unit 302 determines whether an acquisition request to acquire ability information regarding the logical printer is received from the external CPS via the transmission/reception unit 301. In a case where the acquisition request to acquire the ability information regarding the logical printer is received from the external CPS via the transmission/reception unit 301 (YES in step S801), the processing proceeds to step S802. In a case where the acquisition request to acquire the ability information regarding the logical printer is not received from the external CPS via the transmission/reception unit 301 (NO in step S801), the control unit 302 waits for the acquisition request.

In step S802, the control unit 302 analyzes the received acquisition request and determines whether the acquisition request includes a predetermined attribute name for inquiring whether the printer permits the pass-through operation. In a case where the predetermined attribute name is included (YES in step S802), the processing proceeds to step S804. In a case where it is determined that the predetermined attribute name is not included (NO in step S802), the processing proceeds to step S803. An example of the predetermined attribute name is "Job-Pass-through-Supported". The present disclosure, however, is not limited to this. Alternatively, a configuration may be employed in which in a case where the request includes information regarding the pass-through operation, the processing proceeds to step S804.

In step S803, the control unit 302 cooperates with the transmission/reception unit 301 to reference user-agent information in the Hypertext Transfer Protocol (HTTP) request header of a data packet included in the acquisition request. Based on the user-agent information and the association information stored in the setting DB 307, the control unit 302 determines whether an external CPS identified by the user-agent information is an external CPS that supports the pass-through operation. In a case where it is determined that the external CPS is an external CPS that supports the pass-through operation (YES in step S803), the processing proceeds to step S804. In a case where it is determined that the external CPS is an external CPS that does not support the pass-through operation (NO in step S803), the processing proceeds to step S805.

In step S804, the control unit 302 cooperates with the setting management unit 304 to generate first ability information indicating that the pass-through operation is permitted. Specifically, the control unit 302 acquires, from the setting DB 307, ability information regarding a logical printer identified based on identification information identifying a logical printer specified by the external CPS. Based on the acquired ability information, the control unit 302 adds information indicating pass-through to the types of documents for which printing is supported, to generate ability information to which ability information related to the pass-through operation is added. When the generation is completed, the control unit 302 notifies the external CPS as the request source of the generated ability information. For example, in the process of step S804, the control unit 302 notifies the external. CPS as the request source of the ability information illustrated in FIG. 6B.

Meanwhile, in step S805, the control unit 302 cooperates with the setting management unit 304 to generate second ability information indicating that only a document of a particular type is supported, and notify the external CPS as the request source of the second ability information. Specifically, the control unit 302 acquires, from the setting DB 307, ability information regarding a logical printer identified based on identification information identifying a logical printer specified by the external CPS. The control unit 302 generates ability information by rewriting the types of documents for which printing is supported and which are included in the acquired ability information, in drawing formats to be used by applications to output drawings or in formats to be used by applications to output files. For example, the control unit 302 generates ability information by rewriting the types of documents in XPS, EMF, docx, xlsx, or pptx. When the generation is completed, the control unit 302 notifies the external CPS as the request source of the generated ability information. For example, in the process of step S805, the control unit 302 notifies the external CPS as the request source of the ability information illustrated in FIG. 6C. When the notification is completed, the processing returns to step S800. In step S800, the control unit 302 waits for a further acquisition request to acquire ability information.

By the above series of processes, in a case where a logical printer managed by the CPS 104 is registered as an output destination printer of an external CPS, it is possible to prevent data from being converted in the external CPS. The CPS 104 according to the present exemplary embodiment is a cloud print service provided by a vendor. Thus, data of a print job can be converted using a dedicated renderer developed by the vendor. In the conversion using the vendor-specific dedicated renderer, the data can be converted into PDL data according to the image conversion characteristics of the printing apparatus, or PDL data taking into account data interpretation in the printing apparatus. Thus, print quality can be maintained higher than PDL conversion by a general-purpose renderer designed by an OS vendor.

In the first exemplary embodiment, a description has been given of a method for uniformly performing control so that data is not converted on the upstream side. In a second exemplary embodiment, a description is given of, in addition to the processes according to the first exemplary embodiment, an exception process for notifying an external CPS of ability information regarding a logical printer corresponding to an MFP or an SFP that can support only the printing of raster data, without correcting the ability information.

In a case where a print job is transmitted to an MFP or an SFP that supports only documents in raster formats, any of a client, an external CPS, and the CPS 104 needs to generate raster data involving the deterioration of image quality. In the second exemplary embodiment, importance is attached to the prevention of a waste of the calculation resources of a cloud print service. Thus, in the case of an MFP that supports only raster formats, control is performed not to correct ability information so that a data conversion process is performed on the client side.

Figure 9:
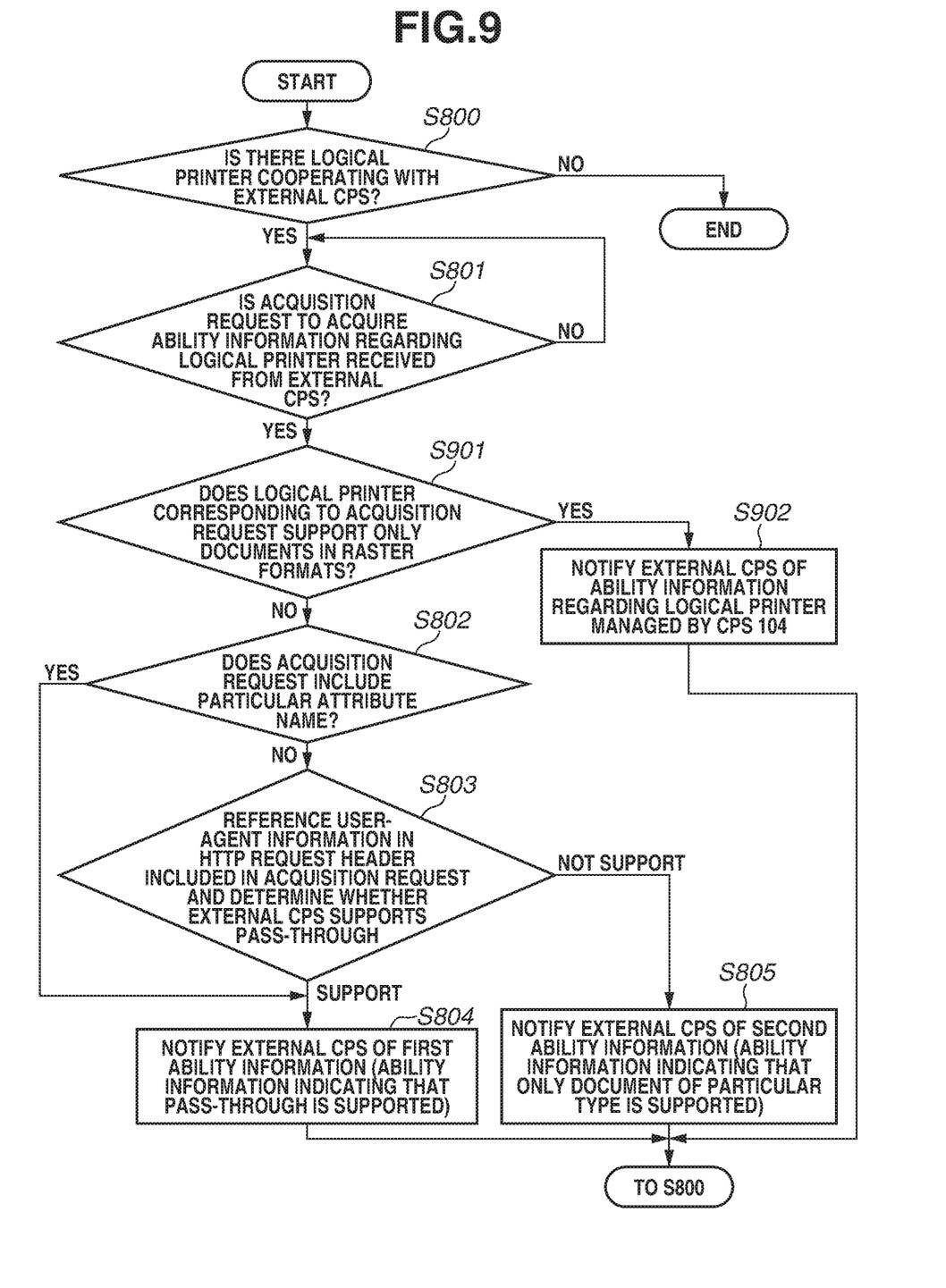
FIG. 9 is a flowchart illustrating an example of control executed by the server that provides the CPS.
Figure 10:
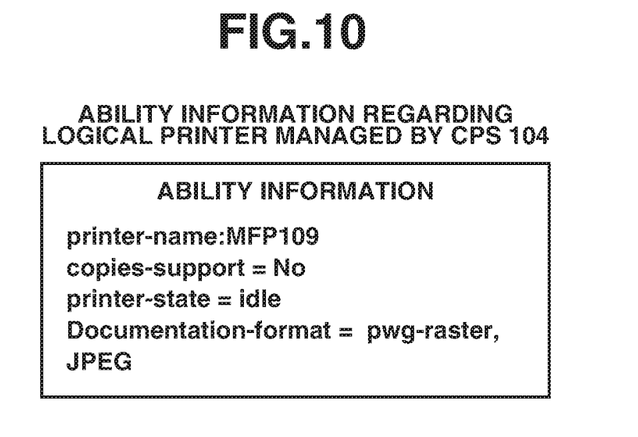
FIG. 10 is a diagram illustrating an example of ability information regarding a logical printer.

The system configuration, the hardware configuration, and the software configuration according to the second exemplary embodiment are similar to those according to the first exemplary embodiment. With reference to FIGS. 9 and 10, specific control is described.

FIG. 9 illustrates an example of processing executed instead of that in the flowchart in FIG. 8 in the first exemplary embodiment. FIG. 9 is different from FIG. 8 in that a determination step illustrated in step S901 is added immediately after the determination step in step S801, and a process illustrated in step S902 is added as a branching destination of the determination in step S901. A description is given by appropriately omitting portions redundant with the description of FIG. 8.

In a case where it is determined in step S801 that the acquisition request to acquire the ability information is received (YES in step S801), the processing proceeds to step S901. In step S901, based on identification information identifying a logical printer included in the acquisition request, the control unit 302 identifies a logical printer. Then, the control unit 302 references the setting management unit 304 and acquires ability information corresponding to the identified logical printer. In a case where it is determined that the identified logical printer is a logical printer that supports only documents in raster formats (YES in step S901), the processing proceeds to step S902. In a case where it is determined that the identified logical printer is a logical printer that supports not only documents in raster formats (NO in step S901), the processing proceeds to step S802. The processes of step S802 and after that are similar to those in the first exemplary embodiment, and therefore are not described.

FIG. 10 illustrates an example of ability information regarding a logical printer corresponding to the MFP 109 and managed by the CPS 104. FIG. 10 illustrates an example of ability information regarding a logical printer corresponding to the MFP 109 that supports only documents in raster formats. The first and second lines indicate that the printer name is "MFP 109", and the printer does not support number-of-copies specifying. The next line indicates that the printer is in an idle state. The last line indicates the types of documents for which the printer supports printing, and indicates that the printer supports PWG-Raster and JPEG. In a case where ability information regarding such a logical printer that supports only raster formats is requested, the processing proceeds to step S902. In a case where, meanwhile, the ability information regarding the logical printer corresponding to the MFP 108 that supports types such as PDF and a PCL as illustrated in FIG. 6A is requested, the processing proceeds to step S802.

The description returns to FIG. 9. In step S902, the control unit 302 notifies the external CPS as the request source of the ability information corresponding to the identified logical printer. When the notification is completed, the control unit 302 waits for a further acquisition request.

By the above series of processes, it is possible to prevent a waste of the calculation resources of a cloud print service in comparison with the first exemplary embodiment.

<Variations>

In the above exemplary embodiments, a case has been illustrated where print data is converted into a document format supported by a real printer. The present disclosure, however, is not limited to this. Alternatively, a configuration can also be employed in which the whole of a print job is converted. For example, a print job received in a job format based on IPP can also be converted into a more appropriate job format for a real printer. Specifically, using Printer Job Language (PJL) for job control, a print job can also be converted into a print job in which PCL is used for print data. Alternatively, a print job can also be converted into a PDL or a job at which a real printer is most excellent. For example, a print job can also be converted into a PDL format compliant with Epson Standard Code for Printers (ESC/P), Refined Printing Command Stream (RPCS), PostScript (PS), Advanced Rendering Tools (ART), or Sharp Printer Description Language (SPDL) series.

According to an aspect of the above exemplary embodiments, in a case where a logical printer of a first cloud print service is registered as an output printer of a second cloud print service, the logical printer is registered so that data is not converted on the second cloud print service. Thus, a decrease in image quality and a waste of cloud resources for a conversion process due to multiple conversion processes can be prevented.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-146643, filed Aug. 8, 2019, which is hereby incorporated by reference herein in its entirety.

What is claimed is:

1. A method for providing a cloud print service, the method comprising:
receiving, from an external apparatus, a print job that is to be transmitted to a printing apparatus, and registering in the cloud print service at least one or more printer objects that is used to transfer the received print job to the printing apparatus;
transmitting, to a second cloud print service, a registration request to register at least one of the printer objects registered in the cloud print service as a cloud printer that is used by the second cloud print service different from the provided cloud print service; and
transmitting, in a case where the cloud printer is registered in the second cloud print service based on the registration request, ability information about a printing apparatus corresponding to the registered cloud printer, wherein the ability information includes first information indicating that a print job including contents data in a first format is receivable, and second information indicating that a print job including contents data in a predetermined format different from the first format is receivable without converting the contents data into the first format.

2. The method according to claim 1, further comprising, after the cloud printer corresponding to the printer object is registered as the cloud printer of the second cloud print service based on the registration request, receiving an acquisition request to acquire ability information from the second cloud print service,
wherein in a case where the acquisition request includes predetermined information for inquiring whether a printing apparatus permits the second cloud print service to transmit a print job received from a print client without converting the print job, ability information includes at least one of the first information and the second information is transmitted.

3. The method according to claim 2, wherein in a case where the acquisition request does not include the predetermined information, ability information indicating that printing of contents data of the predetermined format is supported is transmitted, regardless of a format of contents data for which the printing apparatus corresponding to the printer object actually supports printing.

4. The method according to claim 3, wherein the ability information indicating that the printing of the contents data of the predetermined format is supported is ability information indicating that printing of contents data in an Extensible Markup Language (XML) Paper Specification (XPS) format is supported.

5. The method according to claim 4, further comprising:
converting contents data in the XPS format included in a print job that is to be transmitted to the printer object registered in the cloud print service and is received by the cloud print service via the second cloud print service, into a page description language (PDL) format in which the printing apparatus corresponding to the printer object supports printing; and
transmitting a print job including the converted PDL to a real printer corresponding to the printer object.

6. The method according to claim 1, further comprising, according to a determination, based on information received from the second cloud print service, that the second cloud print service supports an operation mode for transmitting a print job received from a print client without converting the print job, transmitting ability information includes at least one of the first information and the second information.

7. The method according to claim 6, further comprising, according to a determination, based on the received information, that the second cloud print service does not support the operation mode for transmitting a print job received from a print client without converting the print job, transmitting ability information indicating that printing of contents data of the predetermined format is supported, regardless of a type of a document for which the printing apparatus corresponding to the printer object actually supports printing.

8. The method according to claim 7, wherein the ability information indicating that the printing of the contents data of the predetermined format is supported is ability information indicating that printing of contents data in an Extensible Markup Language (XML) Paper Specification (XPS) format is supported.

9. The method according to claim 8, further comprising:
converting contents data in the XPS format included in a print job that is to be transmitted to the printer object registered in the cloud print service and is received by the cloud print service via the second cloud print service, into a page description language (PDL) format for which the printing apparatus corresponding to the printer object supports printing; and transmitting a print job including the converted PDL to a real printer corresponding to the printer object.

10. The method according to claim 1, wherein in a case where a first printer object corresponding to a first printing apparatus that supports printing of the contents data in the first format is registered in the cloud print service, and the first printer object is registered as a cloud printer for the second cloud print service, the ability information including the first information and the second information is transmitted to the second cloud service, and in a case where a second printer object corresponding to a second apparatus that does not support the printing of the contents data in the first format but supports printing of contents data in a raster format is registered in the cloud print service, and the second printer object is registered as a cloud printer for the second cloud print service, ability information that includes third information indicating that a print job including the contents data converted into the raster format is receivable and does not include the first information and the second information is transmitted to the second cloud print service.

11. A server that provides a cloud print service, the server comprising:
  at least one memory that stores a set of instructions; and
  at least one processor that executes the instructions, the instructions, when executed, causing the server to perform operations comprising:
    receiving, from an external apparatus, a print job that is to be transmitted to a printing apparatus, and registering in the cloud print service at least one or more printer objects that is used to transfer the received print job to the printing apparatus;
    transmitting a registration request to register at least one of the printer objects registered in the cloud print service as a cloud printer to be used by a second cloud print service different from the provided cloud print service to the second cloud print service; and
    transmitting, in a case where the cloud printer is registered in the second cloud print service based on the registration request, ability information about a printing apparatus corresponding to the registered cloud printer, wherein the ability information includes first information indicating that a print job including contents data in a first format is receivable, and second information indicating that a print job including contents data in a predetermined format different from the first format is receivable without converting the contents data into the first format.

* * * * *